US010068496B2

(12) United States Patent
Elwell

(10) Patent No.: US 10,068,496 B2
(45) Date of Patent: Sep. 4, 2018

(54) SYSTEM AND METHOD FOR TEACHING BASE-10 MATHEMATICS

(71) Applicant: Paige Elwell, Snohomish, WA (US)

(72) Inventor: Paige Elwell, Snohomish, WA (US)

( * ) Notice: Subject to any disclaimer, the term of this patent is extended or adjusted under 35 U.S.C. 154(b) by 318 days.

(21) Appl. No.: 14/812,679

(22) Filed: Jul. 29, 2015

(65) Prior Publication Data

US 2016/0035252 A1  Feb. 4, 2016

Related U.S. Application Data

(60) Provisional application No. 62/030,528, filed on Jul. 29, 2014.

(51) Int. Cl.
*G09B 23/02* (2006.01)
*G09B 19/02* (2006.01)

(52) U.S. Cl.
CPC .............. *G09B 23/02* (2013.01); *G09B 19/02* (2013.01)

(58) Field of Classification Search
CPC ................................ G09B 19/02; G09B 23/02
USPC .................. 434/210, 128, 191, 188
See application file for complete search history.

(56) References Cited

U.S. PATENT DOCUMENTS

| | | | | |
|---|---|---|---|---|
| 3,908,287 A * | 9/1975 | Darnell | ............... | G09B 19/02 434/210 |
| 4,176,474 A * | 12/1979 | O'Sullivan | ............ | G09B 19/02 434/210 |
| 5,040,987 A * | 8/1991 | Frazier | ................ | G09B 1/06 434/188 |
| 5,865,627 A * | 2/1999 | Foresman | ................ | G09B 1/06 434/191 |
| 6,884,077 B2 * | 4/2005 | Faulkner | ................ | G09B 19/02 434/188 |
| 8,529,266 B1 * | 9/2013 | Akin | ................ | G09B 19/02 434/191 |
| 2014/0106315 A1 * | 4/2014 | Berko-Boateng | ...... | G09B 19/02 434/128 |

OTHER PUBLICATIONS

Montessori Print Shop, retrieved from the internet: "http://www.shop.montessoriprintshop.com/0-to-10-Quantity-Symbol-Word-Matching-MF-34.htm", 2007.*
Google Search retrieved from the internet: https://www.google.com/search?q=quantity+%2B+symbol+%2B+word+%2B+match+%2B+tiles&rlz=1C1GGRV_enUS768US768&biw=960&bih=1432&source=Int&tbs=cdr%3A1%2Ccd_min%3A1%2F1%2F1900%2Ccd_max%3A7%2F28%2F2013&tbm=isch, 2013.*

* cited by examiner

*Primary Examiner* — Eddy Saint-Vil
(74) *Attorney, Agent, or Firm* — Seed Intellectual Property Law Group LLP

(57) ABSTRACT

Systems and methods are provided for teaching students to understand the decimal value system. One system includes removable cards representing the numerical symbol, the numerical quantity, and/or the numerical value of the single digit numbers of the base-10 number system on a digit alphabet table. The removable cards can then be used on student practice components to associate numerical symbol, the numerical quantity, and the numerical word with a corresponding number of unit blocks. The unit blocks are configured to be coupleable and to be used in conjunction with a place value mat that aids in learning magnitude of numbers.

15 Claims, 11 Drawing Sheets

| Thousand | Hundred | Ten | One |
|---|---|---|---|
|  |  |  | 9 |
| 0 | 0 | 0 | 0 |
| 1 | 1 | 1 | 1 |
| 2 | 2 | 2 | 2 |
| 3 | 3 | 3 | 3 |
| 4 | 4 | 4 | 4 |
| 5 | 5 | 5 | 5 |
| 6 | 6 | 6 | 6 |
| 7 | 7 | 7 | 7 |
| 8 | 8 | 8 | 8 |
| 9 | 9 | 9 | 9 |
| 10 | 10 | 10 | 10 |

Figure 6c

SYSTEM AND METHOD FOR TEACHING BASE-10 MATHEMATICS

BACKGROUND

Technical Field

The present disclosure relates to a system and method for teaching the decimal system, and more particularly to a system and method for teaching students to conceptualize the magnitude of place values in decimal numeration by handling representations of words, symbols, quantities, and blocks that are representative of individual units.

Description of the Related Art

Base 10 refers to a common numbering system taught to students in their early years of school. Mastery of this numbering system is important for students to progress through their schooling. The numbering system identifies positions or places of the numbers. For example, a number, such as 768 has an 8 in the one place, a 6 in the ten place, and a 7 in the hundred place. Each position is 10 times the value to the right of it. The numbers continue indefinitely in this pattern: 100000,10000,1000,100,10,10.1,0.01, 0.001, 0.0001, 0.00001.

There are a variety of methods of teaching base 10 in early education to help students grasp number the positions or places for numbers in the base 10 system. These teaching methods try to help students to work with numbers from 11 to 19 to gain an understanding of place value. The place value refers to the ability to understand that a 1 is not just a 1 and in a number like 12, the one represents 10 ones and is considered 1 ten, or a number like 11, the one to the left represents 10 (or 10 ones) and the 1 to the right represents 1.

BRIEF SUMMARY

One embodiment of the present disclosure is directed to a teaching kit that includes a first support that forms a digit alphabet. The first support includes a plurality of symbol removable components, a plurality of quantity removable components, a plurality of word removable components, a symbol row, a quantity row, and a word row, and a plurality of second columns, each column including a location for one of the symbol removable components, one of the quantity removable component, and one of the word removable components. The kit also includes a student practice board that is a second support, which has a symbol location, a quantity location, and a word location, each being configured to receive one of the symbol removable components, one of the quantity removable components, and one of the word removable components, respectively, and a unit grid having a plurality of cells.

The kit includes a plurality of unit blocks, where each unit block is sized and shaped to fit within a single cell. The plurality of unit blocks couple together through magnetism and couple to the second support through magnetism. Also, the plurality of symbol removable components include numerical symbols 0, 1, 2, 3, 4, 5, 6, 7, 8, 9, the plurality of quantity removable components include visual representations of a number of units that represent the numerical symbols 0, 1, 2, 3, 4, 5, 6, 7, 8, 9, and the plurality of word removable components includes the words zero, one, two, three, four, five, six, seven, eight, and nine.

Each of the plurality of symbol removable components, quantity removable component, and word removable components couples to the first support with magnetism. The first and second supports are felt and each of the plurality of symbol removable components, quantity removable component, and word removable components couples to the first support and second support with Velcro.

In addition, the kit further includes a third support for place value, the third support including: a first column, a second column, a third column, and a fourth column, the first column representing a one place, the second column representing a ten place, the third column representing a hundred place, and the fourth column representing a thousand place, each of the columns including a place holder row and a plurality of numbered rows numbered 0, 1, 2, 3, 4, 5, 6, 7, 8, 9, 10. The place holder row is configured to receive the plurality of symbol removable components, the quantity removable component, and the word removable components and the plurality of numbered rows are sized and shaped to receive one hundred of the unit blocks coupled together to form a 10 by 10 flat.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings.

FIGS. 6a-6e are a plurality of examples of the place value mat of FIG. 5 in use;

DETAILED DESCRIPTION

Figures 1, 2:
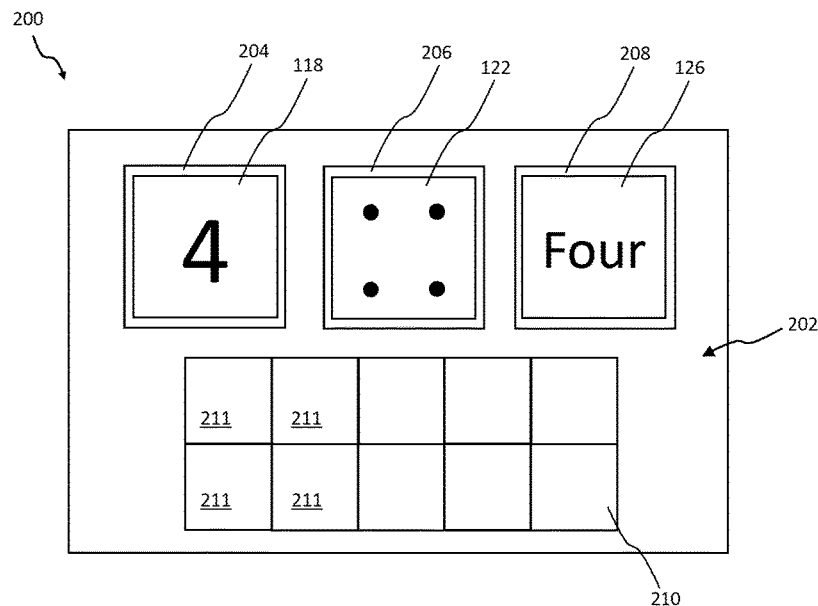
FIG. 1 is a digit alphabet table with three sets of removable cards representing a numerical symbol, a numerical quantity, and a corresponding word according to an embodiment of the present disclosure.
FIG. 2 is a student practice component with one removable card from each set of removable cards shown in FIG. 1.

In the following description, certain specific details are set forth in order to provide a thorough understanding of various embodiments of the disclosure. However, one skilled in the art will understand that the disclosure may be practiced without these specific details. In other instances, well-known structures associated with teaching tools have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and appended claims, the use of "correspond," "corresponds," and "corresponding" is intended to describe a ratio of or a similarity between referenced objects. The use of "correspond" or one of its forms should not be construed to mean the exact shape or size.

In the drawings, identical reference numbers identify similar elements or acts. The size and relative positions of elements in the drawings are not necessarily drawn to scale.

It is important for a student to be able to conceptualize quantity when learning about a base-10 positional number system. To further the student's understanding of number quantity, a number of tools are disclosed to aid in the learning process. The student discussed throughout this disclosure may be a single student or a plurality of students. The embodiments described in this disclosure can help a student understand place value in a base-10 number system and visualize the number of individual units that represent a number. Many young students have difficulty estimating a number of individual units, such as estimating a total number beans in a pile of jelly beans. This system and method can assist a student in visualizing how many units represent a number. In addition, this can help students understand a magnitude of quantity.

The base-10 positional number system is number system that denotes value from position. For example, the numeral 1 may represent one of an infinite number of values depending on where the one is placed relative to a decimal point. The number 10.0 is not the same value as 0.01 despite both having a single 1 and two 0's. The positional number system is contrasted with a unary numeral system, such as tally marks. In a unary numeral system position is irrelevant and numbers are represented by a displaying a number of marks equal to the number. In the tally system, a single line represents each unit. The lines are kept in groups of five by placing four lines adjacent to each other, and then crossing the four lines diagonally with a fifth line. The pattern is then repeated to increase the number. In contrast, the base-10 positional number system uses ten integers (0-9) within each position of the positional number system. The present disclosure uses base-10 by way of example only. The system could easily be adapted to be used as a teaching tool for other positional number system bases. Common bases include 2, 10, and 16, with base-10 being the core number system taught in U.S. primary education.

An aspect of learning the base-10 positional number system is understanding digits, which can be represented by a numerical symbol (1, 2, 3 . . . ), a numerical word (one, two, three . . . ), or a numerical quantity or number of items, where each item represents one unit. FIG. 1 is a digit alphabet table 100 that can provide a student with a visual representation of the relationship between the numerical symbol, the numerical word, and the numerical quantity.

The digit alphabet table 100 includes a reference column 102 that identifies the type of information listed in each row. The digit alphabet table may include a numerical symbol row 104, a numerical quantity row 106 and a numerical word row 108, each of which is identified as Symbol 110, Quantity 112, and Word 114, respectively. The columns of the digit alphabet table 100 relate the numerical symbol to the numerical quantity and the numerical word.

The digit alphabet table 100 is depicted on a digit alphabet display or support 101, which may be any number of display types. In one embodiment the digit alphabet display is a printed image affixed to a board. Other embodiments include a display that is a laminated sheet, a magnetic painted surface, an electronic display or any other known display type. The display may also be any number of sizes, including one embodiment in which the digit alphabet display spans a space on a wall of a classroom and another embodiment in which the digit alphabet display can be held in one hand. The display or support may be a flexible material, such as felt or other soft printable material for ease of transport and for comfort in a young student's hand. Each of the components described below may also be felt, which would gently hold a position once placed on the display.

In one embodiment, the reference column 102 is on a left side of the digit alphabet table 100 on the digit alphabet display 101. The reference column 102 defines the data that is presented in each corresponding row 104, 106, and 108. The first row listed is symbol 110, followed by quantity 112 and word 114. The order of the reference column 102 may be rearranged so long as the corresponding row still aligns with each respective value in the reference column 102.

In one embodiment, each discrete element of the digit alphabet table 100 is on an individual removable card or component 11, 122, 126. The removable card may be placed loosely on the display surface and held in place only by static surface friction or may be temporarily attached by any number of means, including, but not limited to: magnetism, glue, putty, hook and loop fabric fasteners, tape, buttons, hooks, or straps. In an alternate embodiment, each discrete value in the digit alphabet is permanently fixed on the digit alphabet table 100 and removable components may be placed on top of the fixed features.

In one embodiment, the first row is the numerical symbol row 104 that consists of the numbers one though nine written in symbol form (e.g. "0", "1" . . . "9"). The numerical symbols are listed across the digit alphabet table 100 in a line in increasing numerical order. The numerical symbols may be listed from left to right, right to left, top to bottom, or bottom to top. In FIG. 1, the numerical symbols are shown in a line from left to right, beginning with zero on the far left and increasing incrementally up to nine on the far right. A first symbol removable card placement area 116 is shown with a first symbol removable card 118 positioned over it. The first symbol card 118 depicts a numerical symbol representing the number four. In the shown embodiment, there are ten placement areas and ten removable cards in the numerical symbol row 104. The numbers are preferably Western Arabic numerals but may also be any numerical symbols from a base-10 positional number system or any other number system.

The numerical symbol row 104 is aligned with corresponding cards of the numerical quantity row 106 in the digit alphabet table 100. The numerical quantities may be listed from left to right, right to left, top to bottom, or bottom to top, but will always line up with the corresponding symbol from the symbol row. In FIG. 1, the numerical quantities are shown in a line from left to right, beginning with zero on the far left and increasing incrementally up to nine on the far right. A first quantity removable card placement area 120 is shown with a first quantity removable card 122 positioned over it. The first quantity removable card 122 depicts a numerical quantity representing the number four. The first quantity removable card 122 is shown in the same column of the digit alphabet table 100 as the first symbol removable card 118 since they both represent the same number, four. In the shown embodiment, there are ten placement areas and ten removable cards in the numerical quantity row 106. The numerical quantity is shown using a unary numeral system. It may be represented with a dot or dots whose layout may be similar to the style shown on the surface of a die. The numerical quantity may in another embodiment be a common item a student is familiar with, for example brownies or cookies, in which the increasing numerical quantities are represented by showing an increasing number of the common item in each depiction.

The numerical symbol row 104 is also associated with a numerical word row 108 in the digit alphabet table. The numerical words may be listed from left to right, right to left, top to bottom, or bottom to top. In FIG. 1, the numerical words are shown in a line from left to right, beginning with zero on the far left and increasing incrementally up to nine on the far right. A first word removable card placement area 124 is shown with a first word removable card 126 positioned over it. The first word removable card 126 depicts a numerical word representing the number four. The first word removable card 126 is shown in the same column of the digit alphabet table 100 as the first symbol removable card 118 and the first quantity removable card 122 since they all represent the same number, four. In the shown embodiment there are ten placement areas and ten removable cards in the numerical word row 108. The numerical word is the word representation of a numerical symbol (e.g. "zero", "one" . . . "nine"). The words are preferably in English using the Latin based letter alphabet, but may be in any language.

In an alternate embodiment the digit alphabet table shows the numbers zero through nineteen or zero through twenty. In this alternate embodiment the reference column 102 remains the same, but the length of the rows 104, 106, and 108 is adjusted to accommodate the additional columns for the additional numbers, ten through nineteen or ten through twenty.

In a further embodiment the digit alphabet table shows the numbers zero through twenty nine or zero through thirty. In this alternate embodiment the reference column 102 remains the same, but the length of the rows 104, 106, and 108 is adjusted to accommodate the additional columns for the additional numbers, ten through twenty nine or ten through thirty.

FIG. 2 is an embodiment of a student practice component 200. The student practice component 200 may come in various sizes, but in one embodiment is a hand held size. The student practice component 200 may be a rigid or flexible material and comes in various thicknesses from about the thickness of a piece of paper to an inch or more in thickness. In one embodiment the student practice component 200 is a printed image affixed to a board. Other embodiments include a display that is a laminated sheet, a magnetic painted surface, an electronic display or any other known display type.

The student practice component 200 includes four placement areas on a first practice surface 202. In one embodiment, there are three placement areas 204, 206, 208 in a row across the top of the student practice component 200 and a larger fourth placement area 210 beneath the row of three placement areas. The four placement areas may be labeled with their respective category names, may have example types of removable cards depicted in each placement area, may use some other notation to identify each placement area, or may not otherwise annotate each placement area. A first practice placement area 204, a second practice placement area 206, and a third practice placement area 208 correspond to the three categories listed in the reference column 102 of the digit alphabet table 100 shown in FIG. 1, i.e., symbol 110, quantity 112, and word 114. In one embodiment, the placement areas would be organized in the same order as the listing of categories in the reference column 102 of the digit alphabet table 100.

The fourth placement area of the student practice component 200 is a unit block grid 210. In a preferred embodiment the grid includes ten cells 211 arranged in two rows and five columns for unit blocks. The size and dimensions of the grid may be varied to accommodate variations in the length of the digit alphabet table 100 or for presentation purposes. The cells of the grid can be sized to match the dimensions of the unit blocks.

In one embodiment, the removable cards may be temporarily attached to the student practice component 200. By way of example, the first symbol removable card 118 may be position over the first practice placement area 204, the first quantity removable card 122 may be position over the second practice placement area 206, and the first word removable card 126 may be position over the third practice placement area 208. The removable cards may be placed loosely on the display surface and held in place only by static surface friction or may be temporarily attached by any number of means, including, but not limited to: magnetism, glue, putty, Velcro, hook and loop fabric fasteners, tape, buttons, hooks, or straps. In yet another embodiment, the placement areas of the student practice component 200 are permanent or erasable writing surfaces.

In one embodiment, the student practice component may be implemented on an electronic device, such as a tablet computer. For example, on a screen of the tablet computer, the features of the practice component, the three blocks for the three categories, symbol 110, quantity 112, and word 114, may be provided in one area. There may be one "pile" or random assortment cards or digital representations of the symbol 110, quantity 112, and word 114. The student may be able to drag one of the cards from the pile to one of the three blocks, such as a symbol card for the number 4. Then the student can look for and drag a corresponding one of the cards that includes the word "four". This card may be moved from the pile to the next available one of the blocks. The student could drag the card with their finger or a stylus. Alternatively, the student may select a card and then tap the block in which they want to place the card. This process can be completed until all three blocks include the corresponding card for symbol 110, quantity 112, and word 114.

Instead of a single pile, the student may select that the symbol 110, quantity 112, and word 114 cards be separated into separate piles for the type of card. In addition, the electronic device may be programmed to notify the student if not all of the cards correspond or represent the same value.

The student may also be able to tap on the representative cells to add a number of items (one item per cell) that corresponds to the value represented by the cards. There may also be a plurality of units or items at a different location on the screen that can be moved from the pile into the cells.

Figure 3:
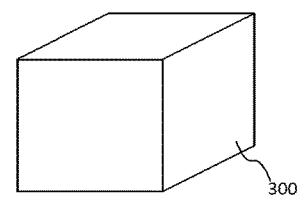
FIG. 3 is one unit block according to an embodiment of the present disclosure.

A unit block according to one embodiment is shown in FIG. 3. In this embodiment, the unit block 300 is a cube that has six identically sized sides. In another embodiment, the unit block 300 is a hexahedron. In a preferred embodiment, the unit block 300 is a cube having six sides, and a height, width, and length equal to 1.5 cm. The sides may be colored uniformly or may have any combination of different colors on different sides.

The unit block 300 may have a coupling device for being attached to another unit block. The coupling device may be below the outer surface of the unit block 300, such as magnetic couplers, or may protrude from the outer surface of the unit block 300, such as protruding magnetic couplers, compression fittings, hook and loop fabric fasteners, Velcro, buttons, or hooks. In the case of a protruding coupling device, the unit block 300 may have a corresponding receiving device to couple to the protruding coupling device of another unit block. Alternatively, or in addition to the unit block 300 having a corresponding receiving device, the student practice component may have a corresponding coupling device or receiving device to couple to the receiving device or coupling device of the unit block 300 respectively.

In the case of a compression fitting coupling device, a first unit block would be attached to a second unit block by forcing a protrusion of the first unit block into a recess in the second unit block. The recess would be a size that provides a compression force on the protrusion sufficient to secure the first and second unit blocks temporarily, but not so strong as to prevent the first and second unit blocks from being coupled initially or to prevent the first and second unit blocks from being uncoupled. Alternatively, in the case of hook and loop fastener fabric, the first unit block would have a fabric on a first side with hooks, and the second unit block would have a fabric on a first side with loops. The two unit blocks would be coupled together by pushing the fabrics together such that the hooks catch in the loops.

Alternatively, or in addition to a unit block 300 having a coupling device and receiving device, the unit block 300 may be coupleable to a second unit block with the use of a block tray. The block tray may come in a variety of sizes, but would preferably be a size that holds ten unit blocks linearly along a first axis. In the linear ten block configuration, the unit blocks are positioned in close proximity to one another along the first axis. In one embodiment, the unit blocks would have a thin wall between them and in another embodiment each unit block would be in contact with the next unit block in line.

The block tray may be any color including a transparent or semi-transparent color, and may be made of any material. In one embodiment the block tray is made of poly(methyl methacrylate) and is semitransparent.

The block tray would preferably be capable of interconnecting with other block trays in a first plane including the first axis and a second plane, the second plane including the first axis and including a second axis orthogonal to the first plane. If the block tray can hold 10 unit blocks, then 10 block trays coupled together is 100 blocks (10×10). A thousand cube can be formed by stacking 10 100 block trays.

The coupling device is paired with a receiving device on a unit block 300. The unit block 300 may have zero, one, or more than one pair of coupling and receiving devices so that a unit block 300 may be coupleable to other unit blocks in one or more than one axis.

Figure 4A:
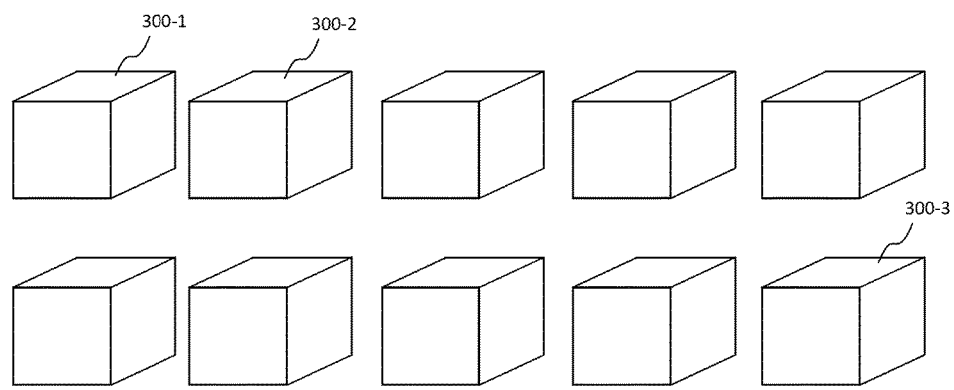
FIGS. 4a-4d are different arrangements of unit blocks from FIG. 3.

FIGS. 4a-4d are an embodiment of the unit blocks 300 in various arrangements. FIG. 4a includes a plurality of the unit blocks 300 spaced apart from one another. The plurality of the unit blocks 300 includes a first unit block 300-1, a second unit block 300-2, and a third unit block 300-3. The unit blocks 300-1, 300-2, and 300-3 may be formed as described above.

There are 10 unit blocks in this group. The unit blocks may be sized and dimensioned so that each block fits in one of the cells 211. In one embodiment, the unit blocks are cubes and the cells are square. The unit blocks have a dimension that is substantially similar to a dimension of the square of the cells. That way, when several unit blocks are placed in adjacent cells, they are very close together and can give the appearance of a single object, comprised of unites. For example, if there are five of the unit blocks placed in a line along a first row of the cells 211, the five unit blocks may appear to be a single rod of five components.

Figure 4B:
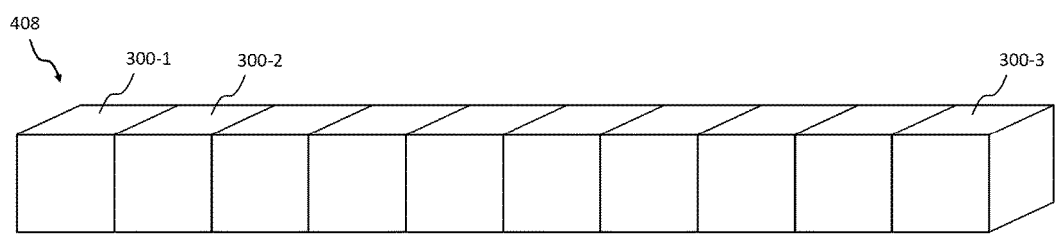

FIG. 4b is the plurality of the unit blocks 300 from FIG. 4a, coupled or composed together to form a base-10 rod 408 of ten unit blocks. The base-10 rod may include the unit blocks 300-1, 300-2, and 300-3. The plurality of unit blocks 400 may be joined in any order and may be coupled along a first axis. The base-10 rod 408 is shown with the first unit block 300-1 on a first end, followed by the second unit block 300-2. The third unit block 300-3 is on a second end of the base-10 rod 408 opposite the first end. The base-10 rod 408 can also be decoupled or decomposed back into ten individual unit blocks. The coupling or composing of the plurality of unit blocks 400 may be by any of the mechanisms previously discussed or may be by co-location of the ten unit blocks without the use of a coupling device. The composition and decomposition of the blocks should be easy for a young child whose dexterity may not be fully developed.

Figure 4C:
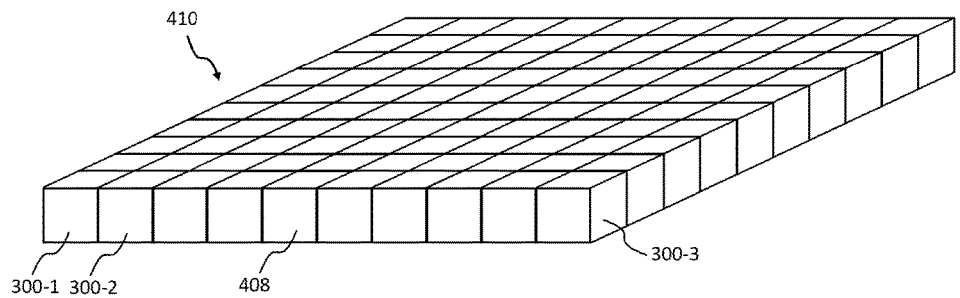

FIG. 4c is a base-10 flat 410 including ten base-10 rods 408. The base-10 flat 410 may include ten base-10 rods coupled together such that the ten base-10 rods are coupled together in a two dimensional plane, and preferably form a square in that plane. In one embodiment, the base-10 rod 408 is joined to nine similar base-10 rods to form the base-10 flat 410. The base-10 rods may be joined in any order but is shown with the base-10 rod 408 on a near side of the base-10 flat 410. Because the base-10 flat 410 includes ten base-10 rods, which each include ten unit blocks, the base-10 flat 410 includes one hundred unit blocks. The coupling or composing of the base-10 rods may be by any of the mechanisms previously discussed with respect to unit block 300 or may be by co-location of the ten base-10 rods without the use of a coupling device.

Figure 4D:
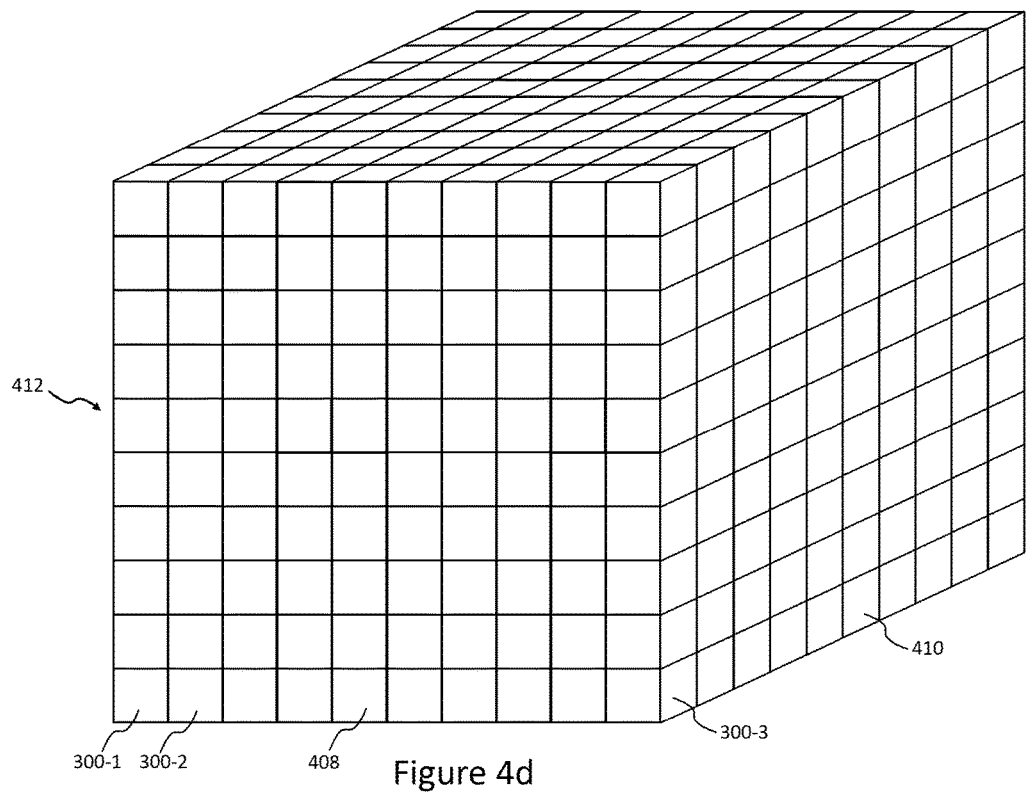

FIG. 4d is a base-10 cube 412 including ten base-10 flats. The base-10 cube 412 may include ten base-10 flats coupled together such that the ten base-10 flats are stacked on one another to form a three dimensional shape, preferably a cube with dimensions approximately equal to ten unit blocks along each axis. In one embodiment, the base-10 flat 410 is joined to nine similar base-10 flats to form the base-10 cube 412. The base-10 flats may be joined in any order but is shown with the base-10 flat 410 on a bottom side of the base-10 cube 412. Because the base-10 cube includes ten base-10 flats, which each include ten base-10 rods, which each include ten unit blocks, the base-10 cube includes one thousand unit blocks. The coupling or composing of the base-10 flats may be by any of the mechanisms previously discussed with respect to unit block 300 or may be by co-location of the ten base-10 flats without the use of a coupling device.

Figure 5:
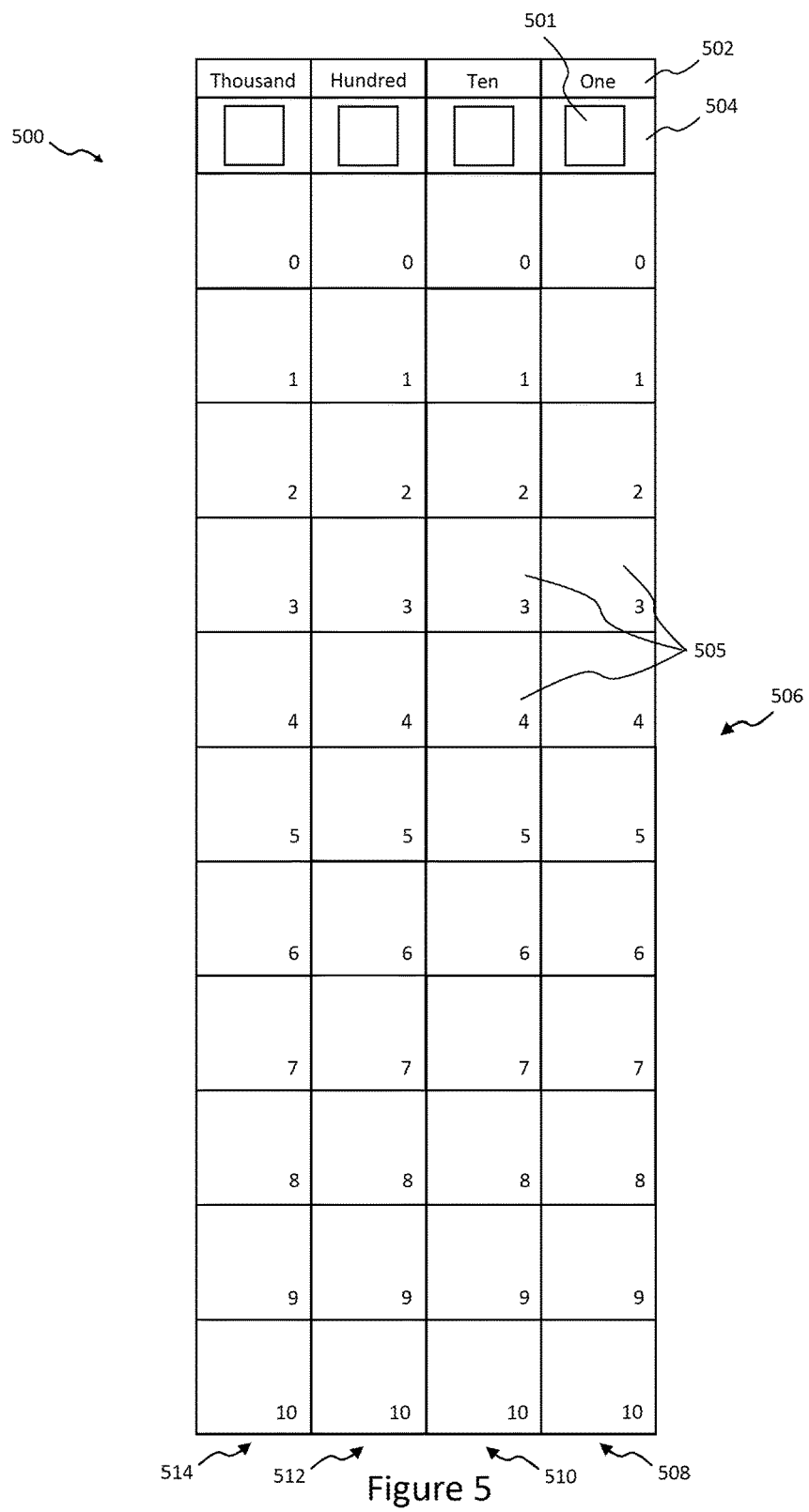
FIG. 5 is a place value mat according to an embodiment of the present disclosure.

FIG. 5 is one embodiment of a place value mat 500. The place value mat 500 may be made of a rigid material or may be made of a flexible material. The place value mat 500 may come in various thicknesses from about the thickness of a piece of paper to an inch or more in thickness. In one embodiment, the place value mat 500 is a printed image affixed to a rigid board. Other embodiments include a mat that is a laminated sheet, a magnetic painted surface, an electronic display or any other known display type. The place value mat 500 may come in various sizes, but in one embodiment is a size that spans a space on a wall of a classroom. The place value mat 500 may be a felt or other soft material that can be rolled up or folded for easy transport. In some embodiments, the place value mat 500 will be a material that is configured to couple or otherwise support a plurality of the unit blocks 300 even if the place value mat is oriented vertically, such as on a wall. For example, the place value mat may be a metal or other magnetic material and the unit blocks 300 may be magnetic. In one embodiment, each unit block only includes a single magnet with the positive pole adjacent to first side and the negative pole adjacent to second side that is opposite to the first side. This will allow the unit blocks to be stacked together in a simple way, by aligning a negative and a positive pole.

The place value mat 500 may have four columns and thirteen rows in one embodiment. The first row, at a top of the place value mat, is a header row 502. The header row 502 includes titles for each column that represent the corresponding place value in a positional number system. The second row from the top of the place value mat 500 is a removable card row 504. The removable card row 504 is compatible with the removable cards shown in FIG. 1 and FIG. 2. There are four placement areas 501, one in each column of the removable card row 504, that are sized to receive the removable cards. The removable cards may be adhered to or otherwise coupled to the placement area or the placement area may be similar to a pocket to receive a plurality of the removable cards. For example, the placement area 501 could be a clear pocket where the top removable card is visible through the clear pocket.

According to one embodiment, the right-most column on the place value mat 500 is the one column 508 corresponding to the title in the header row 502 of that column. The one column 508 represents a first whole number position of the positional number system. To the left of the one column is the ten column 510 corresponding to the title in the header row 502 of that column. The ten column 510 represents a second whole number position of the positional number system. To the left of the ten column 510 is the hundred column 512 corresponding to the title in the header row 502 of that column. The hundred column 512 represents a third whole number position of the positional number system. To the left of the hundred column 512 is the thousand column 514 corresponding to the title in the header row 502 of that column. The thousand column 514 represents a fourth whole number position of the positional number system.

The place value mat 500 includes a place value grid 506 that includes rows three through thirteen in the illustrated embodiment. The rows three through thirteen are number rows on the place value mat 500 and correspond to the digit alphabet numbered in order from zero to ten. The intersection of the columns and the number rows of the place value grid 506 form cells 505. In FIG. 5, number identifiers are printed on the place value mat 500 in a bottom right-hand corner of each corresponding cell. In alternate embodiments, the numbers could be semi-permanently displayed in each cell, could be presented in a different location of the cell, or could be presented in a different manner, such as with a numerical word or a numerical quantity.

Each cell of the place value mat 500 preferably has a height and width approximately equal to ten times the height and width of the unit block 300 respectively, or alternatively, ten times the width and height of the unit block 300 respectively. The sizing results in a base-10 flat 410 having approximately the same two dimensional area on a flat side as each cell 505, and a base-10 cube 412 having a base that is approximately the same two dimensional area as each cell.

In an alternate embodiment, the place value mat 500 may be rotated such that the header row 502 is at the bottom of the place value mat 500 or on one of the sides of the place value mat 500. The columns of the place value grid 506 should be rotated in accordance with the rotation of the header row 502, or rotated in accordance with the rotation of the header row 502 plus or minus about 180 degrees.

The place value mat 500 may include receiving or coupling devices in the cells to couple to the coupling devices of the unit blocks. The receiving or coupling devices may include magnetic plates, recesses, fabric fasteners, protrusions, or any other known coupling device to couple to the unit block 300, the base-10 rod 408, the base-10 flat 410, or the base-10 cube 412.

Figure 6A:
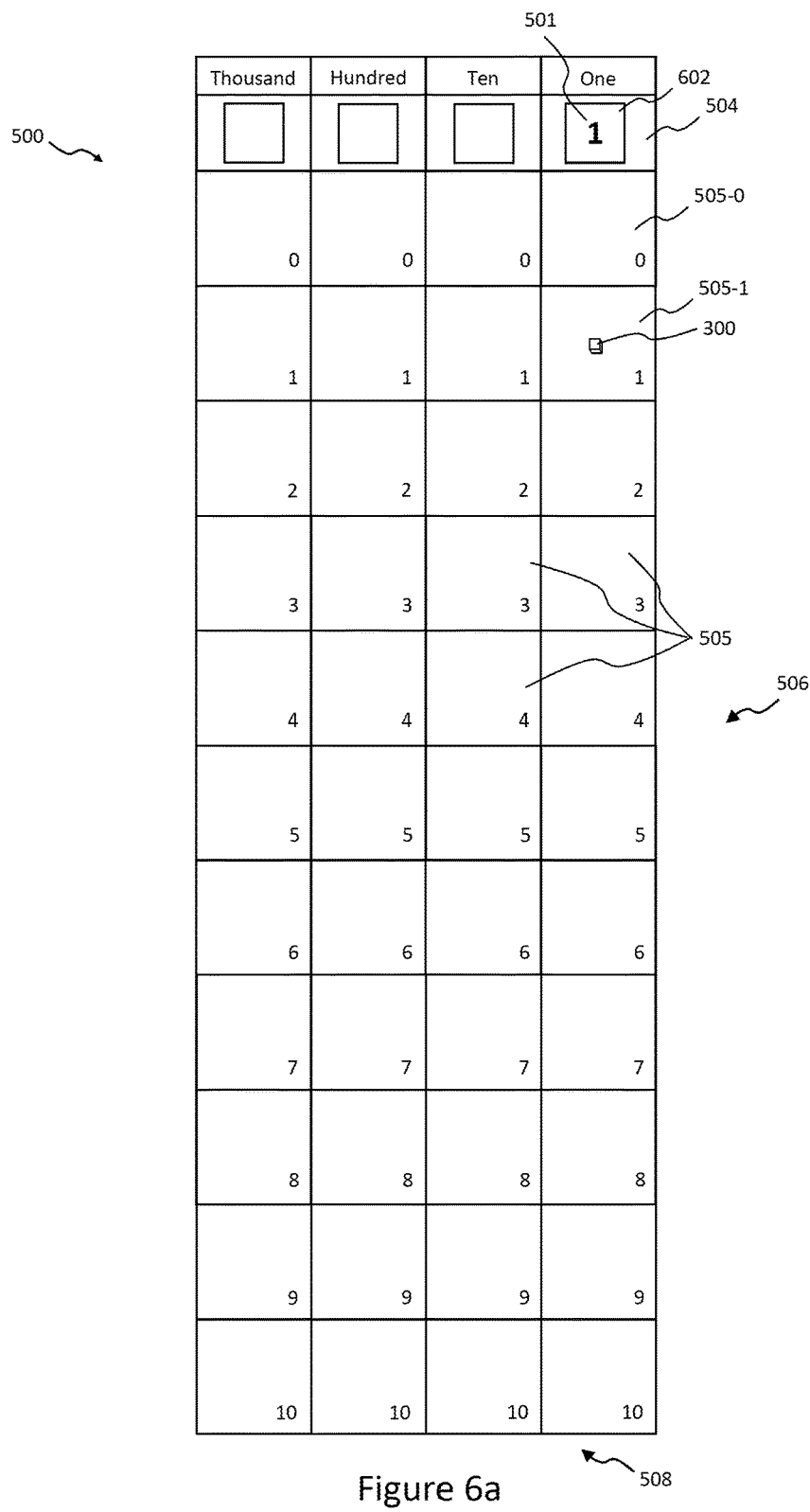

FIGS. 6a-6e are different configurations of an embodiment of the place value mat 500. In FIG. 6a, the place value mat 500 has a first removable card 602 positioned in the placement area 501 of the header row 504 of the one column 508. The first removable card 602 is shown with the numerical symbol "1". Alternatively, the removable card 602 may be any numerical digit, or a numerical word or numerical quantity. The one column 508 of the place value grid 506 will include a number of unit blocks that match the first removable card 602. For example, in FIG. 6a, there is no unit block in a first cell 505-0, but there is a first unit block 300 in a second cell 505-1. The first unit block represents a single unit, which correspondents to the symbol on the first removable card 602.

Figure 6B:
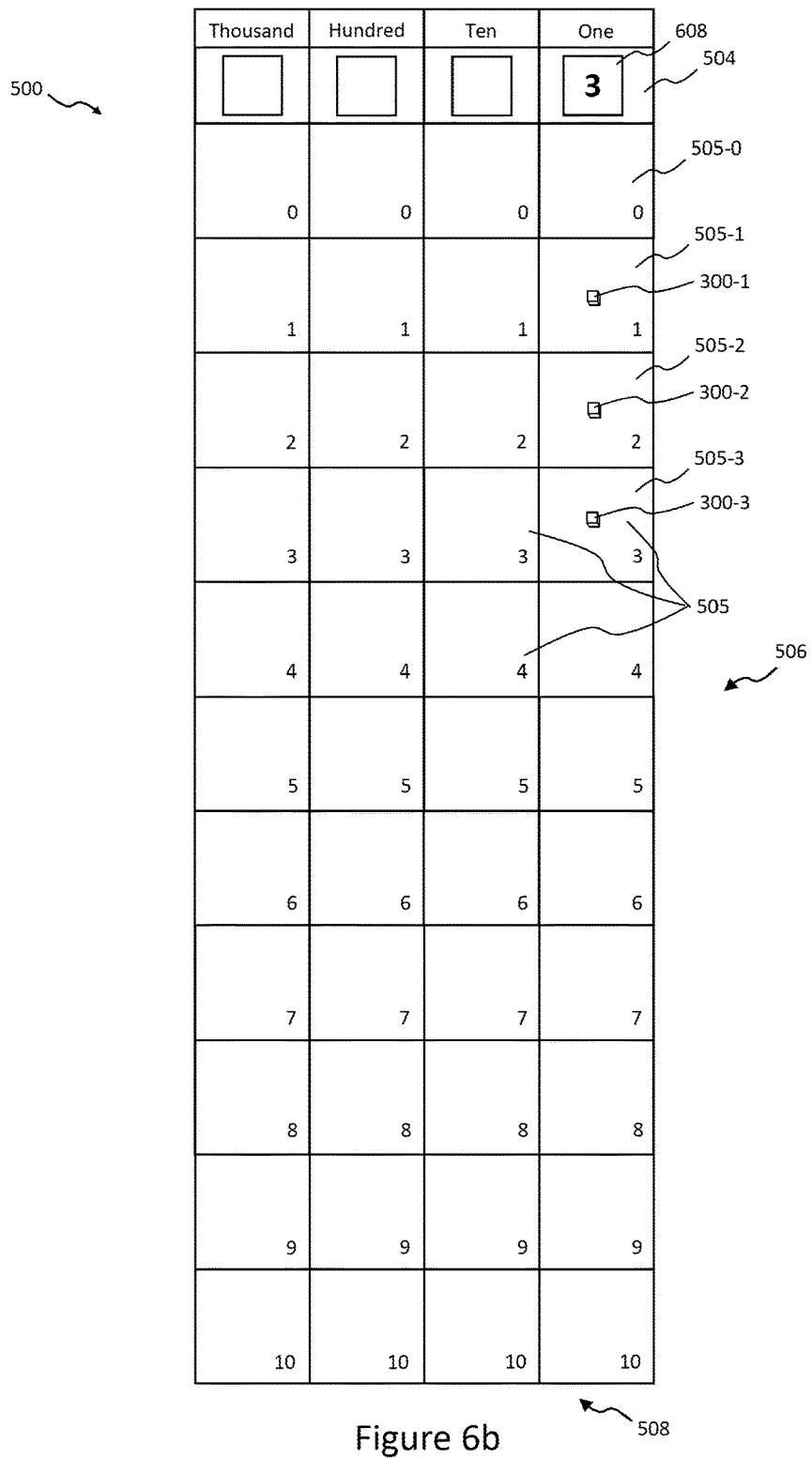

FIG. 6b shows an different configuration of the place value mat 500. A second removable card 608 is positioned in the header row 502 of the one column 508. The second removable card 608 is shown with the numerical symbol "3". The one column 508 of the place value grid 506 includes a number of unit blocks that match the symbol on the second removable card 608. The first cell 604 always remains empty because zero is represented by an absence of any units. The zero row is optional, but may be beneficial for some students to visualize the whole range of numbers from 0-10. There are 3 unit blocks, 300-1, 300-2, 300-3, which are in three consecutive corresponding cells, 505-1, 505-2, 505-3.

FIG. 6c shows another configuration of the place value mat 500. A third removable card 610 is positioned in the header row 502 of the one column 508. The third removable card 610 is shown with the numerical symbol "9". The one column 508 of the place value grid 506 includes a number of unit blocks that match the third removable card 610. The first cell 604 remains empty, but there is a unit block in each one of the cells 505 in the one column 508 except the first cell 604 and a last cell 612. There are a total of 9 unit blocks on the place value mat, all 9 being in the one column. This allows a student to visualize and associate the symbol in the placement area with the number of unit blocks in the one column.

Figure 6D:
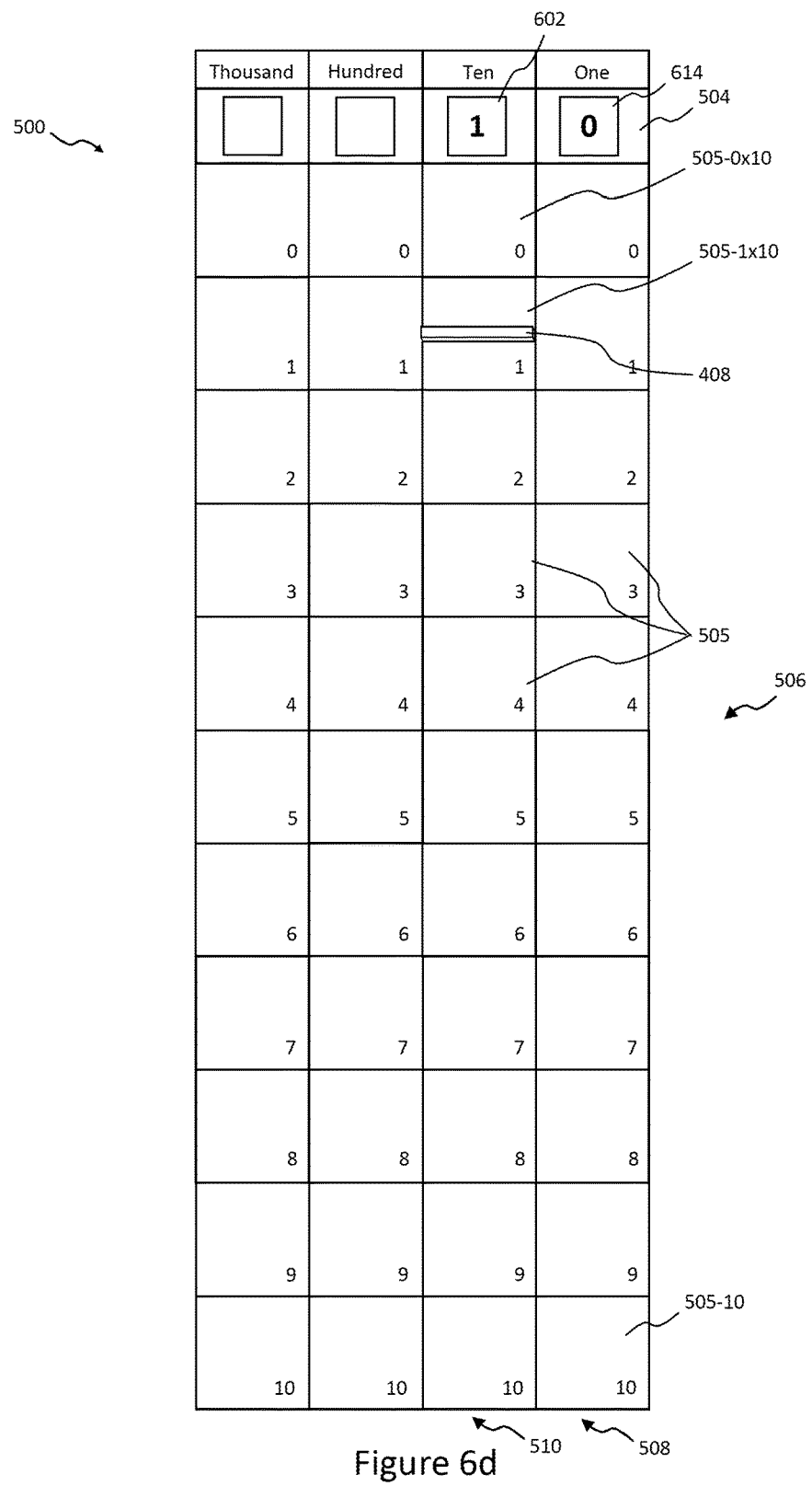

FIG. 6d shows another configuration of the place value mat 500 that represents the number 10. A first removable card 602 is positioned in the header row 502 of the ten column 510 and a fourth removable card 614 is positioned in the header row 502 of the one column 508. The first removable card 602 is shown with the numerical symbol "1". The ten column 510 of the place value grid 506 includes a number of base-10 rods that match the first removable card 602. In FIG. 6d, there is no base-10 rod in a first ten cell 616 because this row represents zero, but there is one base-10 rod 408 in the second ten cell 618. As discussed above, a base-10 rod 408 is a composable and decomposable group of ten unit blocks. The rods is illustrated as being a single unitary element; however, this is just for simplicity of the drawing. The base-10 rod is not a solid rod and instead includes ten separate base-10 blocks coupled together. The base-10 rod can be decomposed and each individual block can be placed in the corresponding one column so that the student can visualize that one base-10 rod is the same as 10 separate unit blocks. In addition a single base-10 rod can also be placed in the 10 cell 612 to represent that ten ones is the same as one ten. This also helps the student visualize the place value associated with base-10 numbers, i.e., the ten's place equals 10 unit blocks.

The fourth removable card 614 is shown with the numerical symbol "0". The one column 508 of the place value grid 506 includes a number of unit blocks that match the fourth removable card 614, thus all cells in the one column 508 are empty of unit blocks.

Figure 6E:
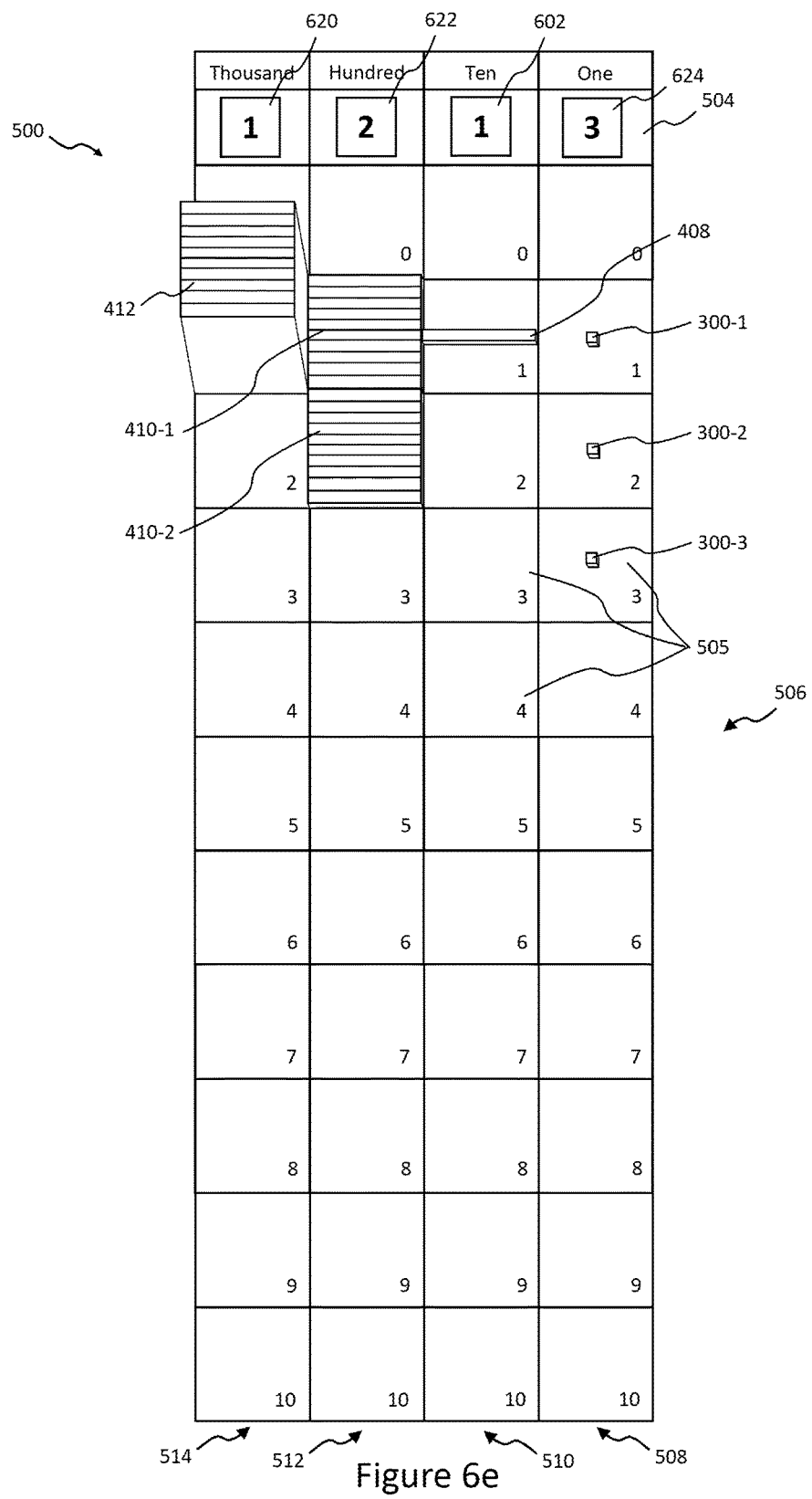

FIG. 6e shows another configuration of the place value mat 500, which represents the number 1213. Removable cards 620, 622, 602, and 624 are positioned in the header row 502 of the thousand column 514, hundred column 512, the ten column 510, and the one column 508, respectively. The removable cards 620, 622, 602, and 624 identify the numerical symbol "1213". The thousand column 514 of the place value grid 506 includes a number of base-10 cubes 412 that match the removable card 620, i.e., there is a single thousand cube that includes 1,000 individual unit blocks in the one row of the thousand column. This represents a "1" in the thousand's place of the number 1213. The lines identifying the individual unit blocks that comprise the cube are not visible for simplicity of the drawing.

The hundred column 512 of the place value grid 506 includes a number of base-10 flats that match the removable card 622. In particular, two base-10 flats 410-1 and 410-2 are positioned in a first and second cell of the hundred column 514 to represent "200". The base-10 flats include 10 base-10 rods coupled together. The number of lines in the flats has been reduced for the simplicity of the drawing.

The ten column 514 of the place value grid 506 includes a number of base-10 rods that match the first removable card 602. One base-10 rod 408 is positioned in a first cell of the ten column 510. The one column 508 of the place value grid 506 includes a number of unit blocks that match the removable card 624. Three unit blocks 300-1, 300-2, and 300-3 are positioned in a first, second and third cell of the one column 508. The three unit blocks represent the number "3" in the one column.

FIGS. 6a-6e also demonstrate a method of using the place value mat 500. The place value mat 500 can be populated with unit blocks to aid a student in conceptualizing number quantity. In one embodiment, the use of the place value mat 500 begins with a person providing a student with a first removable card 602 or having the student select a card from a pile of the removable cards. The first removable card 602 is placed in the one column 508 of the removable card row 504. The student places a number of unit blocks in the one column 504 corresponding to a number represented on the first removable card 602 in the one column 508 and removable card row 504. The unit blocks are populated sequentially beginning with the cell marked "1", the next unit block going in the cell marked "2", and incrementing until the number of unit blocks equals the number on the first removable card 602.

The process is then repeated by the person providing a second removable card 608. The student may either remove all of the unit blocks from the place value mat 500 or only adjust the number of unit blocks by adding or subtracting unit blocks from the place value mat 500 based on the difference between the first removable card 602 and the second removable card 508. In an alternate embodiment, the first removable card 602 represents the quantity zero and the second removable card 608 represents the quantity one. In this embodiment the numbers are increased sequentially until a last number set by the person is reached. The last number may be nine, ten, or any number representable on the place value mat 500.

When counting sequentially from nine to ten as shown in FIG. 6c and FIG. 6d, the person may provide new removable cards first, or may instruct the student to place a tenth unit block in the place value mat 500 first. In the first instance in which the person provides new removable cards to position in the header row 504, the student is then instructed to place the ten unit blocks on the place value mat 500. The student may be corrected if the student chooses to place all ten unit blocks in the one column. The person may then reinforce the digit alphabet for both a correct and an incorrect student by showing them that the blocks are more than the digit alphabet have numbers for, so the student couples or composes the ten unit blocks and moves them into the ten column 510. The reinforcement of the equivalence between one base-10 rod 408 in the ten column 510 and ten unit blocks in the one column 508 is repeated as necessary, with the base-10 rod 408 being coupled and uncoupled at each instance. Additionally, the positional number system is reinforced by highlighting the transition from nine to ten in the header row 504.

In the second instance of this embodiment the student is asked to place a tenth unit block on the place value mat 500 prior to the incrementing of the removable cards. The student is either corrected or positively reinforced for coupling the tenth unit block with the other nine unit blocks and placing the created base-10 rod 408 in the cell marked "1" of the ten column 510. Then the removable cards in the header row 504 are updated to reflect the addition of a tenth unit block. For a student placing the tenth unit block in the cell marked "10" in the One column and leaving the nine previous unit blocks in their previous position, extra instruction is provided on the digit alphabet. As in the first instance, the reinforcement of the equivalence between one base-10 rod in the Ten column and ten unit blocks in the One column is repeated as necessary, with the base-10 rod being coupled and uncoupled at each instance. Additionally, the positional number system is reinforced by highlighting the number over each column to transition from nine to ten.

The process for the student to populate the ten column 510, the hundred column 512, and the thousand column 514 is the same as the process for populating the one column 508, except that the unit block is substituted for a base-10 rod 408, a base-10 flat 410, and a base-10 cube 412, respectively.

In an alternate embodiment, the person provides the student with a number represented by a removable card set as shown in the header row 504 of FIG. 6e, and the student populates the cells of the place value mat for each column based on the number value of the removable card set. The removable card set can be one or more cards and the process of this alternate embodiment may begin with a quantity greater than one. Specifically shown in FIG. 6e, the student may be provided with the quantity one thousand two hundred and thirteen, and be asked to populate the place value mat 500 accordingly. The student would place a base-10 cube 412 in the cell marked "1" in the thousand column 514, base-10 flats 410a and 410b in the cells marked "1" and "2"

in the hundred column 512, a base-10 rod 408 in the cell marked "1" in the ten column 510, and unit blocks 300a, 300b, and 300c in each of the cells marked "1", "2", and "3" in the one column 508. Any corrections and/or positive reinforcement would be provided to the student as previously discussed.

Alternatively, the student may be asked to "build" the number 1,213, by starting from 1 and adding subsequent blocks. Since 1,213 is a larger number, this building option will be described with respect to the number 113. The student would begin by placing ten unit blocks in the cells 505 in the one column, to build a ten rod. The student can assemble the ten unit blocks from the cells 505 and form the ten rod, placed in the 10 row of the one column and then moved to the one row of the ten column. The student can then see that 10 ones is equal to one ten. A similar process can be completed to form a hundred flat, 10 tens is equal to one hundred. Once the hundred column is accurately represented by the number of hundred flats, one in this situation, then the student can create the appropriate number of ten rods. In this case, there is one ten rod. Then, the student can add the appropriate number of unit blocks to meet the number symbol in the one column, in this case, 3 unit blocks. This visualization of the place holders and the representative components can help a student understand the base-10 number system.

Figure 7:
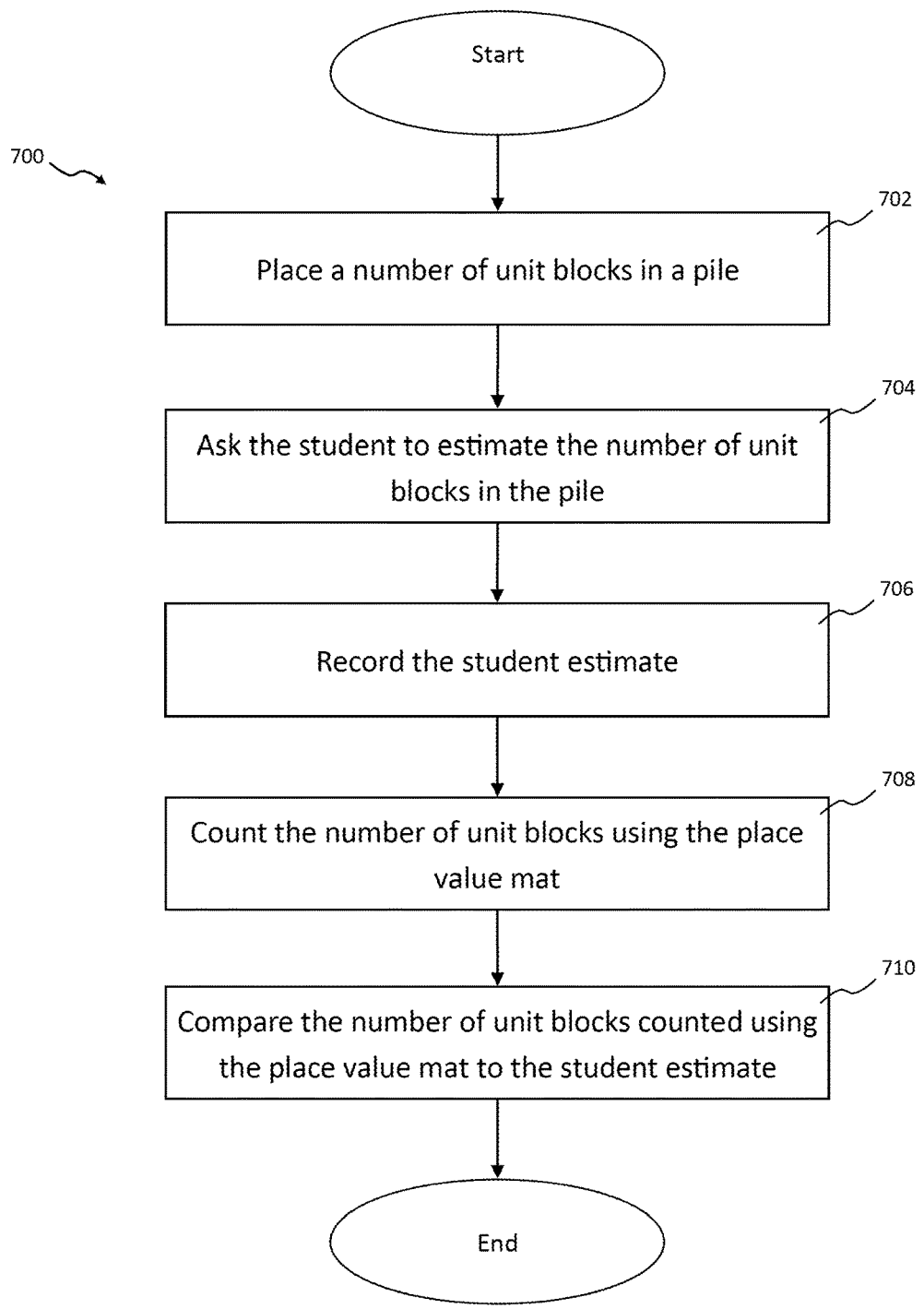
FIG. 7 is a flow chart of a method of using a student practice component according to one embodiment of the present disclosure.

FIG. 7 is a flow chart demonstrating one embodiment of a method of using the place value mat 500. In a first step 702, a person places a number of unit blocks into a pile. Alternatively, a student may be requested to select a random number of blocks without counting them and place the random number of blocks into a pile. The unit blocks should preferably be grouped together, but not sorted or aligned so as to make the total number of unit blocks less apparent. The unit blocks may be placed on the floor, on a raised surface such as a desk or table, or some other location so long as the student can see the pile of unit blocks.

In a second step 704 the person asks the student to estimate the number of unit blocks in the pile. The student may be allowed to observe the pile or physically manipulate the pile, but should not be allowed to count the number of unit blocks before providing an estimate.

In a third step 706 the student estimate is recorded. The student estimate may be recorded on the place value mat 500 using removable cards, or may be recorded in an alternate location for reference later. For example, if the student guesses 32 blocks, then then a three symbol is placed in the ten column and a two symbol is placed in the one column.

A fourth step 708 includes counting the unit blocks using the place value mat 500. In the fourth step 708 a number of different counting methods can be used. In one embodiment, the counting is done by the student populating the one column 508 incrementally from one to nine. Then the student increments the number of unit blocks to ten and the person monitors how the student manipulates the unit blocks on the place value mat 500. If the student collects all nine of the unit blocks in the one column 508 and combines the nine unit blocks with an additional unit block to form a base-10 rod 408 and the student then places the base-10 rod 408 in the cell marked "1" in the ten column 510, then the person provides positive reinforcement. The process can be repeated continuing to populate the ten column 510 until nine base-10 rods have been accumulated. If appropriate, the process is repeated combining the base-10 rods into a base-10 flat 410.

If instead the student leaves a unit block or blocks in the row marked "10", the person provides corrective instruction on the digit alphabet and how to make the number ten by combining the unit blocks by making a base-10 rod in the higher place value holder. The student is shown that there is no physical difference in volume between 10 singular unit blocks and 10 coupled unit blocks forming a base-10 rod. The process can be similarly repeated for base-10 flats and base-10 cubes using base-10 rods and base-10 flats, respectively.

For the number 32, the student would create 3 ten rods in the ten column in sequential cells and two unit blocks in the one column in sequential cells.

Removable cards may be used any time during the use of the place value mat 500. In one embodiment, the removable cards can be incremented with each addition of another unit block. In another embodiment the removable cards may be used to represent the student estimate. In yet another embodiment, the removable cards may be left off until all of the unit blocks have been added to the place value mat 500. Also, different types of removable cards may be used, such as the symbol card, the word card, or the quantity card described above.

In a fifth step 710, the total number of unit blocks counted in the fourth step is compared to the student estimate. The comparison includes a discussion about how conceptually the student estimate would compare when represented with unit blocks as compared to the actual number counted. This comparison may also be accomplished in the physical world with additional unit blocks used to represent the student estimate.

After the fifth step 710, the lesson may be over, or the process may be repeated using the same or a different number of unit blocks. In one embodiment, the process is repeated using a different number of unit blocks that is different from the first number by at least an order of magnitude.

Figure 8:
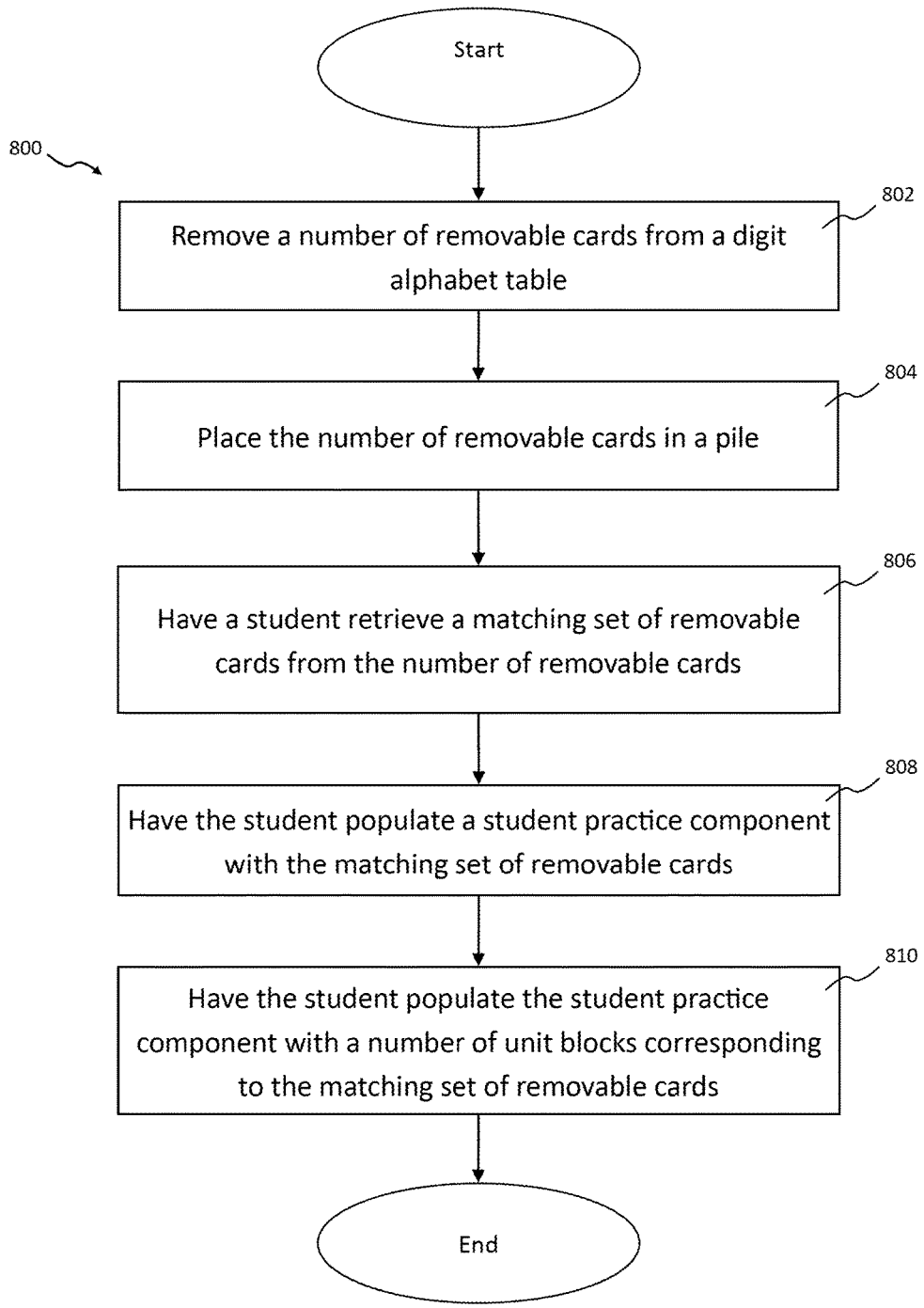
FIG. 8 is a flow chart of a method of using a place value mat according to one embodiment of the present disclosure.

FIG. 8 is a flow chart demonstrating one embodiment of a method of using the student practice component 200 from FIG. 2. In a first step 802, a number of removable cards as previously described are removed from the digit alphabet table 100. The number of removable cards may be all of the cards or a lesser number of removable cards. The lesser number of removable cards may be a smaller subset based on type or number range.

In a second step 804 the person or student places all of the number of removable cards into a pile. In one embodiment the number of removable cards is placed in one pile, and in an alternate embodiment the number of removable cards is subdivided and placed into a number of piles. The subdivision may be based on type or number range.

In a third step 806 the person requests a student retrieve a matching set of removable cards. A matching set includes one symbol removable card, one quantity removable card, and one word removable card. The matching set all represent the same number in their different formats. The request for card retrieval may be a verbal request to the student, may be by selecting one card and requesting the matching cards, may be by providing a number of unit blocks, or may be by some other method.

In a fourth step 808 the student positions the matching set of removable cards on a student display component 200, each removable card is positioned in a corresponding removable card placement area. The positioning might including affixing the removable cards to the student practice component 200, loosely positioning the removable cards on the student display component 200, commanding the matching set of removable cards into the removable card placement areas on an electronic display, or some other method of positioning.

In another embodiment step 808 can be replaced with transposing done by the student, an instructor, an instructor's aid, or any other person. The transposing may be accomplished using a disposable student display component with a number of writing methods, including writing with a pen, pencil, marker, crayon, or any other writing utensil. The transposing me also be accomplished using a temporary writing method on a corresponding erasable surface on the student display component, including writing with a dry-erase marker, wet-erase marker, or pencil.

In a fifth step 810 the student positions a number of unit blocks that corresponds to the number represented by the matching set of removable cards in the unit block grid 210 on the student practice component 200. After the fifth step 810, the lesson may be over, or the process may be repeated using the same or a different number.

The process provides a student with additional tools to understand positional numbering systems. The different systems, devices, and methods disclosed aid the learning process, equating representations of words, symbols, and quantities of decimal digits, and aiding conceptualization of number magnitude in a place value number system.

The digit alphabet of FIG. 1 and the place value mat of FIGS. 6A-6E can be adapted for use in teaching place values on the other side of the decimal, such as the values of 0.01 or 0.001.

The various embodiments described above can be combined to provide further embodiments. To the extent that it is not inconsistent with the specific teachings and definitions herein, U.S. Provisional Patent Application No. 62/030,528, filed Jul. 29, 2014, is incorporated herein by reference in its entirety. Aspects of the embodiments can be modified, if necessary to employ concepts of the application to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A teaching kit, comprising:
 a plurality of symbol removable components;
 a plurality of quantity removable components;
 a plurality of word removable components;
 a first support that includes:
  a symbol row, a quantity row, and a word row; and
  a plurality of columns, each column including a location for one of the symbol removable components, one of the quantity removable components, and one of the word removable components;
 a second support that includes:
  a symbol location, a quantity location, and a word location, each being configured to receive one of the symbol removable components, one of the quantity removable components, and one of the word removable components, respectively; and
  a unit grid having a plurality of cells;
 a third support for place value, the third support including:
  a first column, a second column, a third column, and a fourth column, the first column representing a one place, the second column representing a ten place, the third column representing a hundred place, and the fourth column representing a thousand place, each of the columns including a place holder row and a plurality of numbered rows numbered 0, 1, 2, 3, 4, 5, 6, 7, 8, 9, 10; and
 a plurality of unit blocks, each of the unit blocks representative of a same unit value.

2. The kit of claim 1 wherein each unit block is sized and shaped to fit within a single cell.

3. The kit of claim 1 wherein the plurality of unit blocks couple together through magnetism and couple to the second support through magnetism.

4. The kit of claim 1 wherein the plurality of symbol removable components include numerical symbols 0, 1, 2, 3, 4, 5, 6, 7, 8, 9, the plurality of quantity removable components include visual representations of a number of units that represent the numerical symbols 0, 1, 2, 3, 4, 5, 6, 7, 8, 9, and the plurality of word removable components includes the words zero, one, two, three, four, five, six, seven, eight, and nine.

5. The kit of claim 4 wherein each of the plurality of symbol removable components, quantity removable components, and word removable components couples to the first support with magnetism.

6. The kit of claim 4 wherein the first and second support are felt and each of the plurality of symbol removable components, quantity removable components, and word removable components couples to the first support and second support with Velcro.

7. The kit of claim 1 wherein the place holder row is configured to receive the plurality of symbol removable components, the quantity removable components, and the word removable components.

8. The kit of claim 7 wherein the plurality of numbered rows are sized and shaped to receive one hundred of the unit blocks coupled together to form a 10 by 10 flat.

9. A teaching kit, comprising:
 a plurality of cards that includes:
  a plurality of symbol cards;
  a plurality of quantity cards; and
  a plurality of word cards;
 a digit alphabet board that includes:
  a symbol row, a quantity row, and a word row; and
  a plurality of number columns, each column including a location for one of the symbol cards, one of the quantity cards, and one of the word cards, each location being sized and shaped to receive one of the symbol cards, one of the quantity cards, and one of the word cards, respectively;
 a plurality of unit blocks, each of the unit blocks representative of a same unit value; and
 a student practice sheet that includes:
  a symbol location marker, a quantity location marker, and a word location marker, each marker being sized and shaped to receive one of the symbol cards, one of the quantity cards, and one of the word cards, respectively; and
  a unit grid having a plurality of cells, each unit cell sized and shaped to receive one of the plurality of unit blocks; and
 a place value mat that includes:
  a first column, a second column, a third column, and a fourth column, the first column representing a one place, the second column representing a ten place, the third column representing a hundred place, and the fourth column representing a thousand place, each of the columns including a place holder row and a plurality of numbered rows numbered 0, 1, 2, 3, 4, 5, 6, 7, 8, 9, 10.

10. The kit of claim 9 wherein the plurality of unit blocks couple together through magnetism and couple to the second support through magnetism.

11. The kit of claim 9 wherein the plurality of symbol cards include numerical symbols 0, 1, 2, 3, 4, 5, 6, 7, 8, 9, the plurality of quantity cards include visual representations of a number of units that represent the numerical symbols 0, 1, 2, 3, 4, 5, 6, 7, 8, 9, and the plurality of word cards includes the words zero, one, two, three, four, five, six, seven, eight, and nine.

12. The kit of claim 11 wherein each of the plurality of symbol cards, quantity cards, and word cards couples to the first support with magnetism.

13. The kit of claim 11 wherein the digit alphabet board and student practice sheet include felt and each of the plurality of symbol cards, quantity cards, and word cards couples to the felt with Velcro.

14. The kit of claim 9 wherein the place holder row is configured to receive a portion of the plurality of symbol cards, the quantity cards, or the word cards.

15. The kit of claim 14, wherein the plurality of numbered rows are sized and shaped to receive one hundred of the unit blocks coupled together to form a 10 by 10 flat.

* * * * *